(No Model.) 2 Sheets—Sheet 1.

A. LOISEAU.
COMBINED OPERA OR FIELD GLASS AND CAMERA.

No. 246,164. Patented Aug. 23, 1881.

Witnesses:
C. J. Hedrick
E. E. Masson

Inventor
Alphonse Loiseau
by A. Pollok
his attorney (No Model.) 2 Sheets—Sheet 2.

A. LOISEAU.
COMBINED OPERA OR FIELD GLASS AND CAMERA.

No. 246,164. Patented Aug. 23, 1881.

Witnesses
C. J. Hedrick
E. E. Masson

Alphonse Loiseau
by A. Pollok
his attorney.

UNITED STATES PATENT OFFICE.

ALPHONSE LOISEAU, OF PARIS, FRANCE.

COMBINED OPERA OR FIELD GLASS AND CAMERA.

SPECIFICATION forming part of Letters Patent No. 246,164, dated August 23, 1881.

Application filed April 19, 1881. (No model.) Patented in France November 4, 1879.

*To all whom it may concern:*

Be it known that I, ALPHONSE LOISEAU, of Paris, in the Republic of France, have invented certain improvements in opera and field glasses, and glasses of a similar character, for rendering them applicable as a photographic apparatus, of which improvements the following specification is a full description.

This invention relates to improvements in opera or field glasses, and glasses of a similar character, for rendering them applicable as a photographic apparatus, in order that tourists and others, without being required to carry a photographic apparatus of ordinary construction, may readily take, by means of such glasses, photographic pictures of any landscapes or objects desired.

The ocular end of an opera-glass can be adapted to receive a photographic objective, and by placing at the opposite end a frame for receiving a ground-glass screen for focusing, and a frame containing a sensitized plate for taking a negative, such glasses can readily be converted into a photographic apparatus. By using such sensitized plates as are employed for instantaneous photography the operator may take instantaneous impressions while simply holding the glass in his hand, thus dispensing with a stand for this purpose.

With double or twin glasses a sensitized plate may be applied to each barrel, so as to obtain stereoscopic views; or one barrel may be arranged to receive a sensitized glass for photographing, and the other a ground-glass screen for focusing, so that the operator may hold the latter to the eye while he passes with the glass over the landscape, in order to determine the exact view he wishes to take, and then, having arrived at such point, he may rapidly uncover and re-cover the sensitized plate, so as to obtain the photographic picture of such view.

The arrangement of the glasses may be variously modified for carrying out the purposes of this invention.

Figure 1:
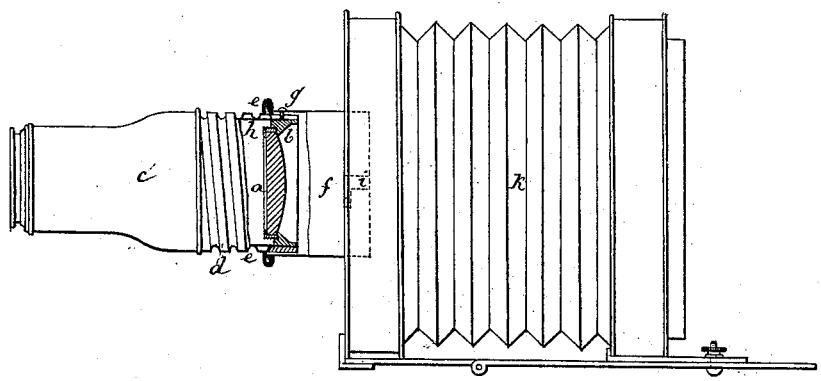
Figure 3:
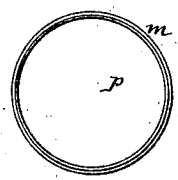
Figure 4:
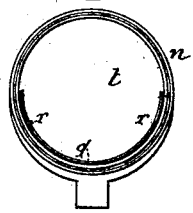
Figure 2:
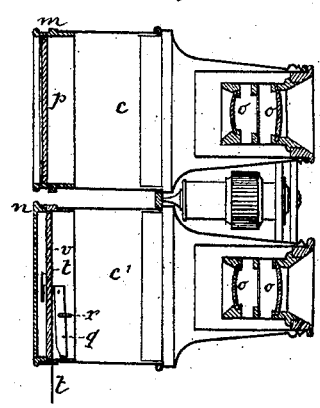
Figure 6:
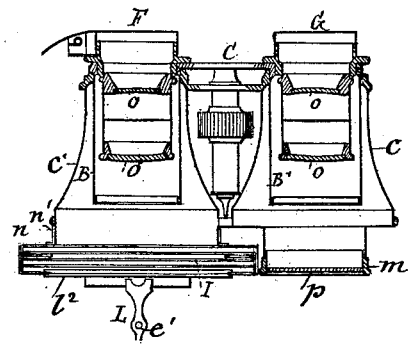
Figure 5:
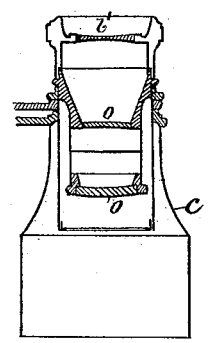
Figure 10:
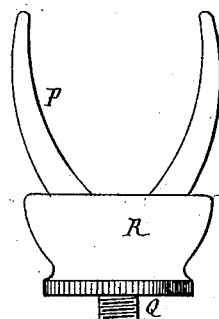
Figure 7:
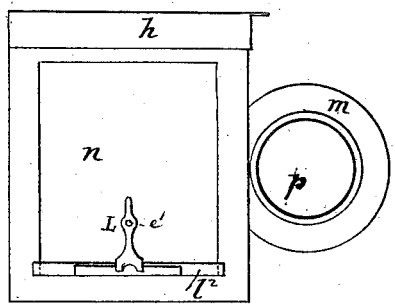
Figure 8:
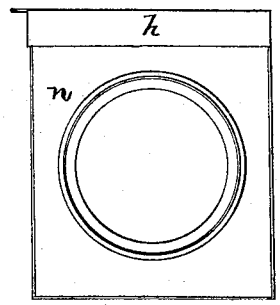
Figure 9:
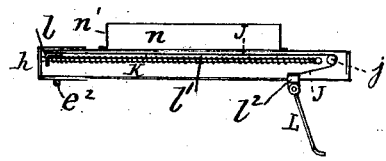
Figure 9:
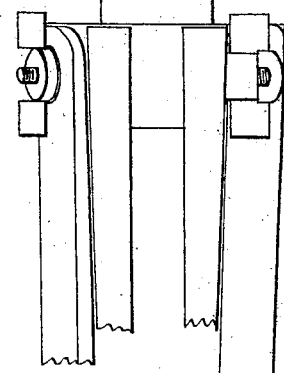

In the accompanying drawings, which form a part of this specification, Figure 1 is a side view, partly in section, showing one arrangement; Fig. 2, a horizontal section showing another arrangement; Figs. 3 and 4, detail views of a portion of the apparatus shown in Fig. 2; Fig. 5, a partial view, in horizontal section, showing a third arrangement; and Figs. 6 and 7, a horizontal section and an end view of a fourth arrangement. Figs. 8 and 9 are detail views of a portion of the apparatus shown in Figs. 6 and 7, and Fig. 10 a side view of a portable stand that can be used to support the glass.

In the arrangement shown in Figs. 2, 3, and 4, the rims, tubes, or caps carrying the eye-pieces and objectives or large lenses of an ordinary opera, field, or marine glass, which are attached to the barrels $c$ $c'$ by means of bayonet-joints, so that they can be readily detached, are for photographic purposes replaced by other caps or devices. In place of the eye-pieces, tubes provided with objectives $o$ $o$, similar to those used in ordinary photographic apparatus, are employed, and at the opposite ends of the barrels is placed rim $m$, having a ground-glass screen, $p$, which is fitted in the place of one of the objectives, and a frame or circular box, $n$, which is fitted in place of the other objective, and which contains the sensitized plate. This plate $v$ is held in its place by a groove, and it is protected from the light by a slide, $t$, which at the proper moment is drawn outward through a slit in the cap or box. When this is done the slit is closed automatically by a semicircular cover, $q$, which is acted upon by a spring, $r$, and the entrance of light through it is thus prevented. The slide $t$ has a small pin entering a groove in the cap, to hold it in place.

In the arrangement shown in Fig. 1 the cap $b$ of the barrel $c'$, carrying the objective $a$ of the opera-glass, is not removed, but the frame or box for the sensitive plate is held in position outside of it. The barrel is provided with an external screw-thread, $d$, and upon this thread is fitted a screw-ring, $e$. A cylindrical piece, $f$, having a stud, $g$, fitting a groove, $h$, fits loosely over the end of barrel $c'$, and is loosely connected with the screw-ring $e$, so that by turning the said screw-ring the cylindrical piece will be slid to and fro on the barrel, but is prevented from rotating by the engagement of stud $g$ in the groove $h$. To the cylindrical piece $f$ is connected, by means of a bayonet-joint, $i$, a small collapsible camera obscura, $k$, such as is used for ordinary photographic apparatus, with provision for inserting the focusing-screen and the sensitized plate, in the usual manner.

According to the arrangement shown in Fig. 5, instead of entirely removing the eye-piece of the glass and replacing it by a photographic objective, the latter is permanently attached to the glass, and when this is used as an opera or field glass a cap having a double-concave lens, $b'$, is simply fixed over each of the barrels, whereby these are rendered applicable as eyeglasses.

The arrangement shown in Figs. 6, 7, 8, and 9 is applicable where the glasses are to be used mainly for photographic purposes, and it is only occasionally desired to use them as opera or field glasses. The barrel $c'$ has at the end in which the photographic objective is placed a hinged cover, F, acted upon by a spring connected with the hinge and arranged to hold the cover shut, so that the aperture can be rapidly opened and closed for photographing by pressing upon a tail of the cover with the finger and then releasing it. To the other end of the same barrel a rectangular box-like frame, $n$, of larger dimensions than the barrel of the glass, is attached by a rim, $n'$, fitting over or into the barrel. One end of the box-like frame is open for the insertion of the sensitized plate I, and it has a hinged cover, $h$, for closing said end when the glass is introduced. In front of the sensitized glass is a dark-screen, J, (see Fig. 9,) of flexible material, the corners of which at one end are attached to the angle-pieces $l$, that run upon two guide-bars, $l'$, on which are helical springs K, tending to keep the screen drawn over the sensitized plate. The other end of the screen is led over a roller, $j$, and connected to a sliding bar, $l^2$, at the rear side of the frame, which bar has a handle, L, by which it, together with the screen, can be drawn along, thereby withdrawing the screen from in front of the sensitized plate against the action of the springs. The screen may be secured in this position by hooking the eye $e'$ of said handle onto a stud, $e^2$, on the frame. On again releasing the handle the springs draw the screen rapidly over the sensitized glass again. The second barrel of the glass has fitted to its large end a cap, $m$, having a central tube, with the focusing-screen $p$, made of smaller diameter than the barrel, in order to make room for the enlarged size of the box-frame on the other barrel. The front end of the other barrel is also provided with a photographic objective, fitted, like that in the first barrel, in a sliding tube, and the two tubes are connected by a cross-bar, O, and are moved in and out for focusing by a screw action in the same manner as the eye-pieces of the opera-glass.

As before stated, when a sensitized surface, such as brominized gelatine, is used that allows of instantaneous photography, the instrument may be merely held in the hand while operating; but in other cases a light portable tripod-stand may be provided, the upper end of which carries a double claw, P, hinged by a universal joint to a stem, Q, having a screw-thread, on which is a screw-ring, R, projecting over the lower ends of the claws. By first introducing a barrel of the before-described apparatus between the claws, and then screwing up the cap, so as to move the claws toward each other, the apparatus will be held firmly between the claws.

Having now fully described the said invention and the manner of carrying the same into effect, what I claim is—

1. A convertible binocular glass and photographic apparatus, comprising the adjustable barrels, detachable eye-pieces, and photographic appliances, substantially as described.

2. The combination, with the barrel and large lens or objective of an opera or similar glass, of a camera obscura or box for a sensitive photographic plate applied to the enlarged end of said barrel, so as to be used in connection with the said glass, substantially as described.

3. The combination, with the lenses of a photographic objective, of an additional lens, by the application of which said photographic lenses are adapted to the purposes of an opera, field, or similar glass, substantially as described.

4. The stand comprising the tripod, the holding-claws, and screw-ring for bringing said claws together, in combination with a photographic apparatus comprising photographic objectives and camera applied to the barrels of an opera or similar glass, substantially as described.

In witness whereof I have hereunto signed my name in the presence of two subscribing witnesses.

ALPHONSE LOISEAU.

Witnesses:
ROBT. M. HOOPER,
CHARLES MARDELET.